(12) United States Patent
Sano et al.

(10) Patent No.: US 9,286,242 B2
(45) Date of Patent: Mar. 15, 2016

(54) INFORMATION PROCESSING APPARATUS AND PROGRAM EXECUTION METHOD

(71) Applicant: Kabushiki Kaisha Toshiba, Minato-ku, Tokyo (JP)

(72) Inventors: Shintarou Sano, Kawasaki (JP); Shunsuke Sasaki, Tokyo (JP); Hiroshi Isozaki, Kawasaki (JP); Jun Kanai, Inagi (JP); Toshiki Kizu, Yokohama (JP); Ryuta Nara, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/198,003

(22) Filed: Mar. 5, 2014

(65) Prior Publication Data
US 2015/0082053 A1     Mar. 19, 2015

(30) Foreign Application Priority Data

Sep. 17, 2013 (JP) ................................. 2013-191382

(51) Int. Cl.
*G06F 12/14* (2006.01)
(52) U.S. Cl.
CPC ........ *G06F 12/1408* (2013.01); *G06F 12/1491* (2013.01)
(58) Field of Classification Search
CPC .................................................. G06F 12/1408
USPC ........................................................ 713/193
See application file for complete search history.

(56) References Cited

U.S. PATENT DOCUMENTS

| 7,305,534 B2 * | 12/2007 | Watt ................... G06F 9/30181 711/163 |
| 7,874,009 B2 | 1/2011 | Kanemura |
| 2008/0250217 A1 * | 10/2008 | Kershaw et al. .............. 711/163 |
| 2010/0174919 A1 | 7/2010 | Ito et al. |

FOREIGN PATENT DOCUMENTS

| JP | 2006-506754 A | 2/2006 |
| JP | 2010-182296 A | 8/2010 |
| WO | 2006/126686 A1 | 11/2006 |

OTHER PUBLICATIONS

ARM Limited "ARM Security Technology—Building a Secure System using TrustZone", Revision C, all pages including Chapters 1-7 (Apr. 2009).

(Continued)

*Primary Examiner* — Peter Shaw
(74) *Attorney, Agent, or Firm* — White & Case LLP (57) ABSTRACT

According to one embodiment, an information processing apparatus includes a processor, a main memory, and a memory controller. The memory controller executes an access restriction for each memory region. A first program decodes a protected program which was encrypted in a secure mode. The first program places the protected program which was decoded in a memory region. A second program executes the protected program in a secure mode. The processor places a code region and a protected data region in the protected program which was decoded in a memory region having an access restriction by using the first program. When an access to the protected data region is confirmed, the processor confirms by using the second program that the access is caused by a command from the code region placed by the first program, and then, executes the command.

13 Claims, 5 Drawing Sheets

(56) References Cited

OTHER PUBLICATIONS

ARM Limited "CoreLink TrustZone Address Space Controller TZC-380 technical Reference Manual", Revision:r0p1, all pages including Chapter 1-4 and appendices (Jul. 2010).

Jun Kanai et al., "LiSTEE Secure Platform Software", Toshiba Review vol. 69, No. 1, pp. 27-30 (2014).

Japanese Office Action issued in Japanese Patent Application No. 2013-191382 dated Dec. 15, 2015, with English Translation.

* cited by examiner

INFORMATION PROCESSING APPARATUS AND PROGRAM EXECUTION METHOD

CROSS-REFERENCE TO RELATED APPLICATIONS

This application is based upon and claims the benefit of priority from Japanese Patent Application No. 2013-191382, filed on Sep. 17, 2013; the entire contents of which are incorporated herein by reference.

FIELD

Embodiments described herein relate generally to an information processing apparatus and a program execution method.

BACKGROUND

Conventionally, an information processing apparatus needs to realize a prevention of falsification and a data protection for a program running on a universal OS (Operation System). In general, the universal OS has a large scale, so that it is difficult to secure reliability for the prevention of falsification and the data protection.

In order to secure reliability, there has been known a technique of using a processor having a plurality of security modes, for example. The processor of this type runs a universal OS with a mode having low security level. The processor also runs a small-scale secure OS, which is specialized for security, in a mode with a high security level. When there is a program requiring prevention of falsification and data needed to be protected, the information processing apparatus executes the program on the secure OS. The secure OS described above is small-scale, so that it has less library and system call than the universal OS. A program running on the secure OS is difficult to be created, because the secure OS has a small number of libraries and system calls. Since a development tool for the secure OS is relatively few, a large-scale program development of the program to operate on the secure OS is difficult.

DETAILED DESCRIPTION

In general, according to one embodiment, an information processing apparatus includes a processor, a main memory, and a memory controller. The processor operates by switching two or more security modes. The main memory includes a memory region to which the processor accesses. The memory controller controls the main memory. The memory controller identifies whether the processor is in a secure mode or in a non-secure mode out of the security modes. The secure mode has a highest security level. The non-secure mode has a security level lower than the secure mode. The memory controller executes an access restriction to each the memory region according to the identified security mode. The processor places a first program and a second program in a memory region having the access restriction. In the secure mode, the first program decodes a protected program which was encrypted. The first program also places the protected program which was decoded in the memory region. The second program executes the protected program in the secure mode. The processor places a code region and a protected data region of the protected program which was decoded in the memory region having the access restriction by using the first program. When an access to the protected data region is confirmed during the execution of the program in the non-secure mode, the processor confirms by using the second program that the access is caused by a command from the code region placed by the first program, and then, executes the command.

Exemplary embodiments of an information processing apparatus and a program execution method will be explained below in detail with reference to the accompanying drawings. The present invention is not limited to the following embodiments.

Figure 1:
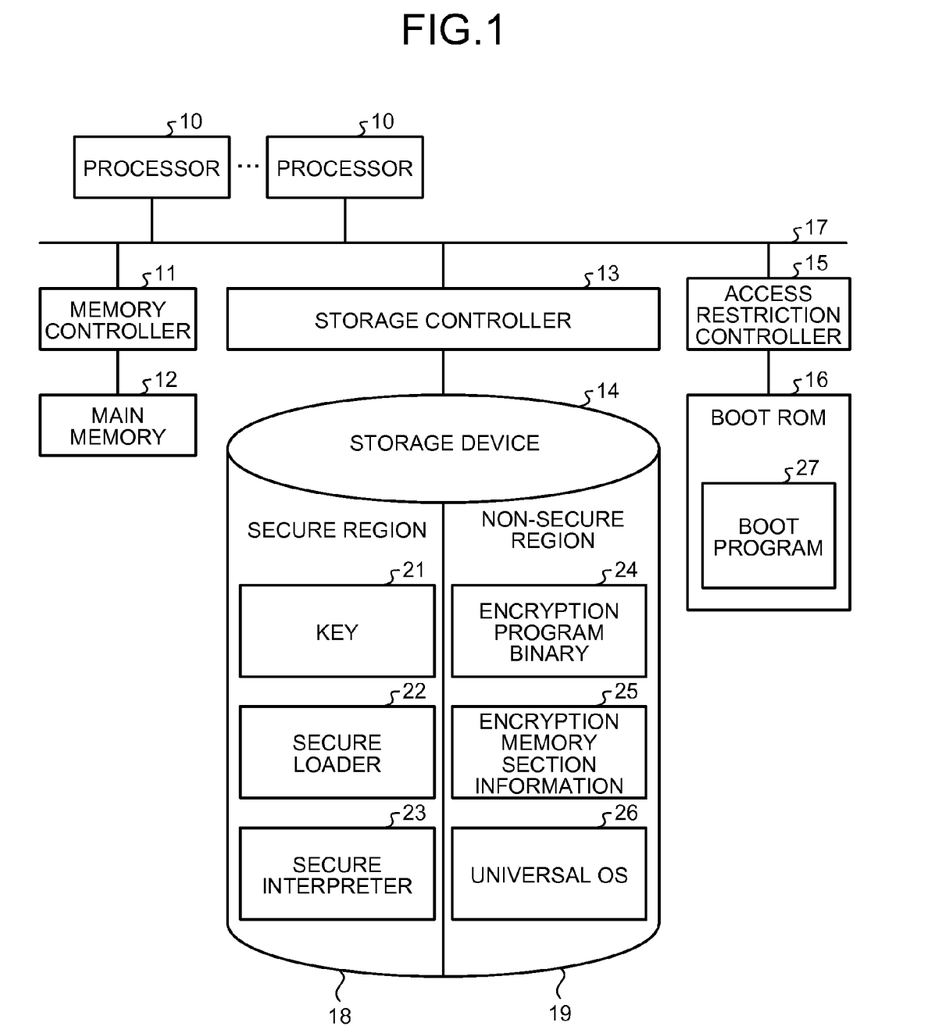
FIG. 1 is a block diagram illustrating a schematic configuration of an information processing apparatus according to an embodiment.

FIG. 1 is a block diagram illustrating a schematic configuration of an information processing apparatus according to an embodiment. The information processing apparatus includes a processor 10, a memory controller 11, a main memory 12, a storage controller 13, a storage device 14, an access restriction controller 15, and a boot ROM 16. The processor 10, the memory controller 11, the storage controller 13, and the access restriction controller 15 are interconnected with a bus 17.

The processor 10 sequentially executes a command loaded from the main memory 12 or data processing. The processor 10 writes results obtained by executing the command or the data processing to the main memory 12. The processor 10 in any number may be provided to the information processing apparatus.

The processor 10 operates by switching two security modes, each having a different security level. A secure mode is a security mode with a high security level. A non-secure mode is a security mode with a low security level.

The processor 10 can be operated by switching two or more security modes. It is supposed that the secure mode is the mode with a highest security level out of two or more security modes. It is also supposed that the non-secure mode is the mode with a security level lower than the security level of the secure mode out of the two or more security modes.

A cache in the processor 10 identifies the secure mode and the non-secure mode. The processor 10 can selectively switch an operation in the secure mode and an operation in the non-secure mode.

In the present embodiment, the processor 10 includes a register for the operation in the secure mode and a register for the operation in the non-secure mode. In the secure mode, the processor 10 uses the dedicated register for the secure mode. In the non-secure mode, the processor 10 uses the dedicated register for the non-secure mode.

In the secure mode, the processor 10 can perform a reading access and a writing access to the dedicated register for the non-secure mode. The register holds a data used in the execution of a program, and a program counter. The program counter indicates a value representing a memory address storing a command that should be executed next.

The processor 10 has a mode transition command for changing the security mode. The security mode of the processor 10 upon the start or reset of the information processing apparatus is the secure mode.

The main memory 12 is a general-purpose main storage device. The main memory 12 includes a memory region to which the processor 10 can access. The main memory 12 is any one of a DRAM, an SRAM, a NAND, and an MRAM.

The memory controller 11 controls the main memory 12. The memory controller 11 executes data reading and data writing to the main memory 12 based upon an instruction from the processor 10. The memory controller 11 receives data read from the main memory 12 and data to be written to the main memory 12. In addition, the memory controller 11 executes refresh of the main memory 12. When a DRAM is used as the main memory 12, for example, the memory controller 11 is a DRAM controller.

The memory controller 11 identifies whether the security mode of the processor 10 is the secure mode or the non-secure mode. For example, the processor 10 transmits status information indicating that the current security mode is the secure mode or the non-secure mode. The memory controller 11 identifies whether the security mode of the processor 10 is the secure mode or the non-secure mode by receiving the status information from the processor 10.

The memory controller 11 has a function of restricting an access to a specific memory region in the main memory 12 according to the security mode of the processor 10. The memory controller 11 executes an access restriction to each memory region in the main memory 12 according to the identified security mode.

When there is an access violating the access restriction, the memory controller 11 denies the access, and transmits an exception signal, indicating an occurrence of exception, to the processor 10. When receiving the exception signal, the processor 10 changes the security mode to the secure mode from the non-secure mode as an exception process.

The storage device 14 is a non-volatile memory with capacity larger than that of the main memory 12. The storage device 14 includes a storage region to which the processor 10 can access. The storage device 14 may be any one of HDD, SSD, and SD card. The information processing apparatus may include a plurality of storage devices 14. The plurality of storage devices 14 included in the information processing apparatus may be the same type, or may be different.

The storage controller 13 controls the storage device 14. The storage controller 13 executes data reading and data writing to the storage device 14 based upon an instruction from the processor 10. The storage controller 13 receives data read from the storage device 14 and data to be written on the storage device 14.

The storage controller 13 has a function of restricting an access to a specific storage region in the storage device 14 according to the security mode of the processor 10. The storage controller 13 executes an access restriction for each of data regions of the storage device 14 according to the identified security mode.

The storage device 14 includes a secure region 18 and a non-secure region 19. The secure region 18 is the storage region to which an access is permitted in the secure mode and the non-secure mode. The non-secure region 19 is the storage region to which an access is restricted in the secure mode and an access is permitted in the non-secure mode.

The storage device 14 stores a key 21, a secure loader 22, and a secure interpreter 23 in the secure region 18. The storage device 14 stores an encryption program binary 24, encryption memory section information 25, and universal OS 26 in the non-secure region 19.

The key 21 is used to decode the encryption program binary 24 and the encryption memory section information 25. The encryption program binary 24 and the memory section information 25 may use a common key 21 or a different key 21 for decoding.

The encryption program binary 24 is a protected program which was encrypted. The protected program is a program binary that needs prevention of falsification. The encryption memory section information 25 is encrypted memory section information. The memory section information is information specifying a placement of a program in the main memory 12.

Figure 2:
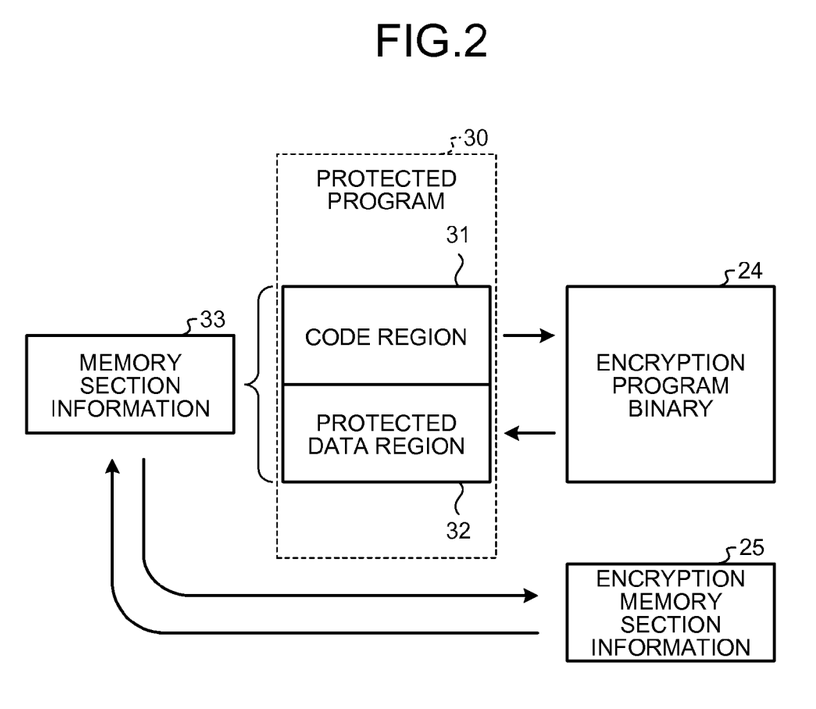
FIG. 2 is a view illustrating a relationship among a protected program, memory section information, an encryption program binary, and encryption memory section information.

FIG. 2 is a view illustrating a relationship among the protected program, the memory section information, the encryption program binary, and the encryption memory section information. A protected program 30 includes a code region 31 and a protected data region 32. The encryption program binary 24 is the one formed by encrypting the protected program 30.

The code region 31 and the protected data region 32 of the protected program 30 are placed in the memory region of the main memory 12 according to memory section information 33. The memory section information 33 includes information of a position where an execution of a program is started. The encryption memory section information 25 is the one formed by encrypting the memory section information 33.

The secure loader 22 that is a first program is a program for loading the encryption program binary 24. The secure loader 22 decodes the encryption program binary 24 in the secure mode. The secure loader 22 places the protected program which was decoded in the memory region of the main memory 12.

The secure interpreter 23 that is a second program is a program for making an access to the protected program 30 in the secure mode, for the program executed in the non-secure mode. The secure interpreter 23 executes the protected program 30 in the secure mode.

The boot ROM 16 stores a boot program 27. The boot program 27 is a program code executed upon the start of the information processing apparatus. Upon the start of the information processing apparatus, the processor 10 firstly reads the boot program 27 from the boot ROM 16, and starts the execution of the boot program 27.

The access restriction controller 15 controls the boot ROM 16. The access restriction controller 15 permits an access to the boot ROM 16 only in the secure mode.

Figure 3:
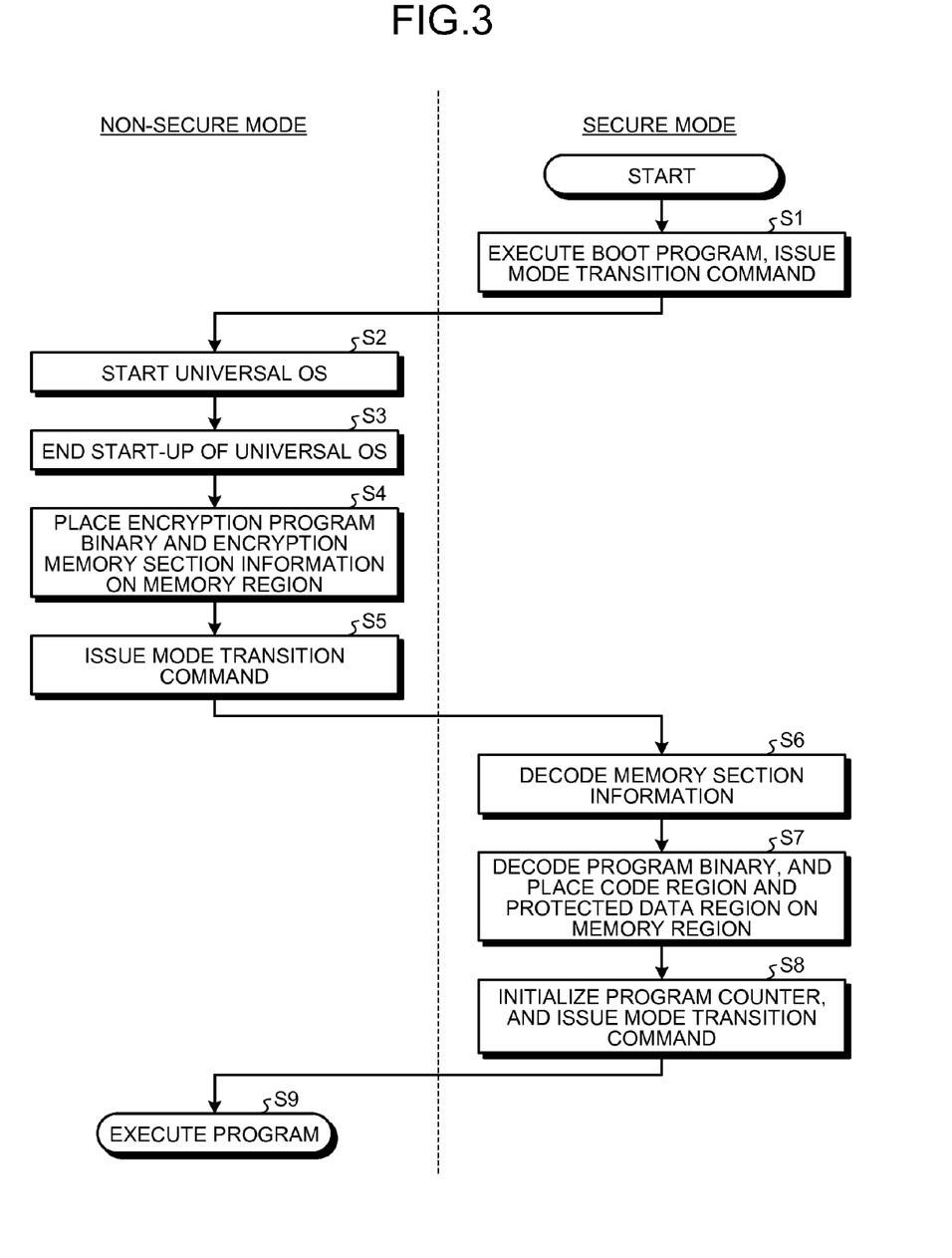
FIGS. 3 and 4 are flowcharts illustrating a procedure of a program execution by the information processing apparatus.
Figure 4:
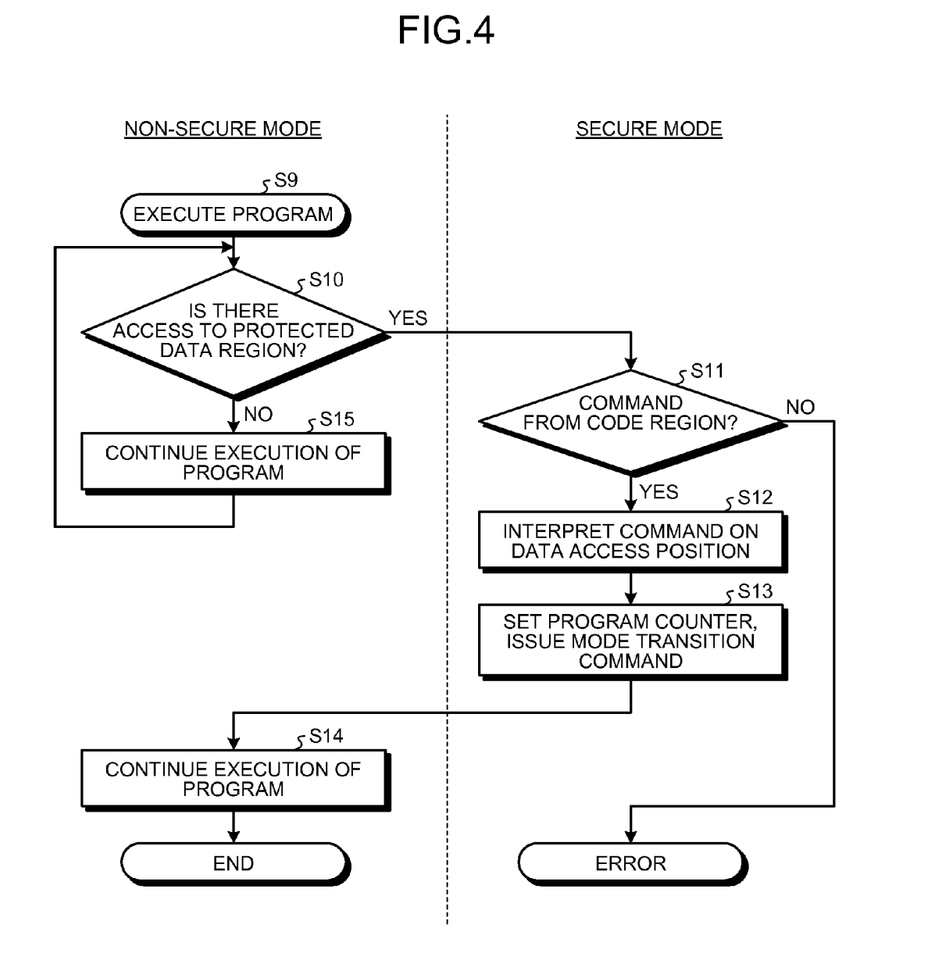

FIGS. 3 and 4 are flowcharts illustrating a procedure of a program execution by the information processing apparatus. The flowchart in FIG. 3 illustrates the procedure from the start of the information processing apparatus till the start of an execution of a program in the non-secure mode. The flowchart in FIG. 4 illustrates the procedure after the start of the execution of the program in the non-secure mode. The flowchart in FIG. 3 illustrates the procedure when an operation is normal. The flowchart in FIG. 4 includes the procedure when there is an abnormal operation.

Upon the start of the information processing apparatus, the security mode is supposed to be the secure mode. After the information processing apparatus is started, the processor 10 reads the boot program 27 from the boot ROM 16 in step S1. Since the security mode is the secure mode, the access restriction controller 15 permits an access to the boot ROM 16 by the processor 10. The processor 10 executes the boot program 27.

The processor 10 reads the key 21, the secure loader 22, and the secure interpreter 23 from the secure region 18 of the storage device 14 by the execution of the boot program 27.

Since the security mode is the secure mode, the storage controller 13 permits an access to the secure region 18 by the processor 10.

By the execution of the boot program 27, the processor 10 places the key 21, the secure loader 22, and the secure interpreter 23 on the memory region in the main memory 12 to which an access in the non-secure mode is inhibited.

By the execution of the boot program 27, the processor 10 reads the universal OS 26 from the non-secure region 19 in the storage device 14. By the execution of the boot program 27, the processor 10 places the universal OS 26 on the memory region in the main memory 12 to which an access in the non-secure mode is not inhibited.

Figure 5:
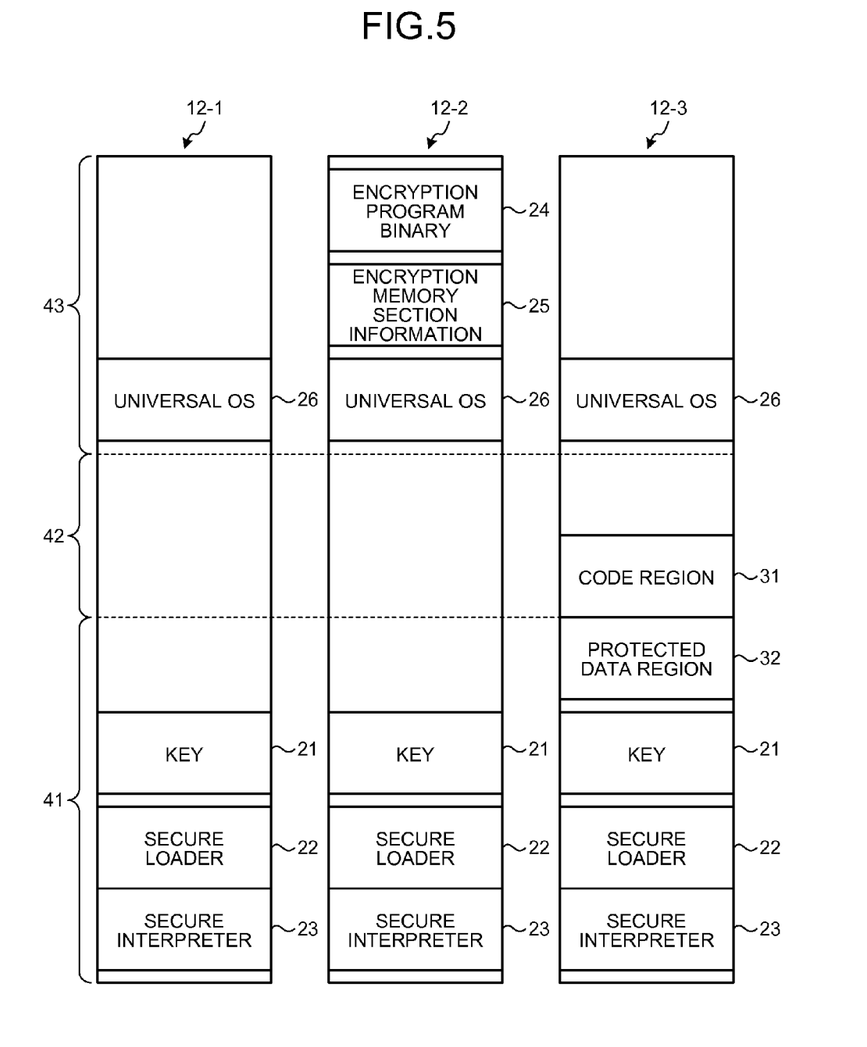
FIG. 5 is a view illustrating an example of a setting of a memory region and a data placement in a main memory.

FIG. 5 is a view illustrating an example of a setting of a memory region and a data placement in the main memory. A main memory 12-1 illustrated in FIG. 5 is a main memory 12 where the key 21, the secure loader 22, the secure interpreter 23, and the universal OS 26 are placed by the execution of the boot program 27.

The main memory 12 includes a first memory region 41, a second memory region 42, and a third memory region 43. The first memory region 41 is the memory region to which data writing and data reading in the non-secure mode are inhibited due to the access restriction. The second memory region 42 is the memory region to which the data writing in the non-secure mode is inhibited due to the access restriction, but the data reading in the non-secure mode is permitted. The third memory region 43 is the memory region to which the data writing and the data reading in the non-secure mode are permitted.

The first memory region 41 out of the memory regions 41, 42, and 43 is the memory region having the highest security level. The third memory region 43 is the memory region having the lowest security level. The processor 10 places the key 21, the secure loader 22, and the secure interpreter 23 in the first memory region 41 by the execution of the boot program 27. Since the security mode is the secure mode, the memory controller 11 permits an access to the first memory region 41 by the processor 10. The processor 10 places the universal OS 26 in the third memory region 43 by the execution of the boot program 27.

In step S1, the processor 10 places the key 21, the secure loader 22, the secure interpreter 23, and the universal OS 26 in the main memory 12, and then, issues the mode transition command. Since the mode transition command is issued, the information processing apparatus switches the security mode from the secure mode to the non-secure mode.

After the change to the non-secure mode, the processor 10 reads the universal OS 26 from the main memory 12, and starts the universal OS 26 in step S2. In step S3, the processor 10 ends the start of the universal OS 26. Next, the processor 10 starts a loading process of a program. In step S4, the processor 10 reads the encryption program binary 24 and the encryption memory section information 25 from the non-secure region 19 in the storage device 14.

The processor 10 places the read encryption program binary 24 and the encryption memory section information 25 in the third memory region 43 in the main memory 12. A main memory 12-2 illustrated in FIG. 5 is the main memory 12 when the encryption program binary 24 and the encryption memory section information 25 are placed by the loading process.

After placing the encryption program binary 24 and the encryption memory section information 25 in the main memory 12, the processor 10 issues the mode transition command in step S5. By the issuance of the mode transition command, the information processing apparatus switches the security mode to the secure mode from the non-secure mode.

When the security mode is changed to the secure mode, the processor 10 reads the key 21 and the secure loader 22 from the first memory region 41. Since the security mode is the secure mode, the memory controller 11 permits an access to the first memory region 41 by the processor 10. The processes from step S6 to step S8 described below is carried out by the execution of the secure loader 22.

In step S6, the processor 10 reads the encryption memory section information 25 from the third memory region 43 by the execution of the secure loader 22. The processor 10 decodes the read encryption memory section information 25 by use of the key 21.

In step S7, the processor 10 reads the encryption program binary 24 from the third memory region 43 by the execution of the secure loader 22. The processor 10 decodes the read encryption program binary 24 by use of the key 21.

The processor 10 places the code region 31 in the protected program 30 which was decoded on the second memory region 42 in the main memory 12 by the execution of the secure loader 22. The processor 10 also places the protected data region 32 in the protected program 30 which was decoded on the first memory region 41 in the main memory 12.

The processor 10 places the code region 31 on the second memory region 42, and places the protected data region 32 on the first memory region 41 according to the decoded memory section information 33. Since the security mode is the secure mode, the memory controller 11 permits an access to the first memory region 41 and the second memory region 42 by the processor 10. A main memory 12-3 illustrated in FIG. 5 is the main memory 12 on which the code region 31 and the protected data region 32 are placed by the execution of the secure loader 22.

After placing the code region 31 and the protected data region 32 in the main memory 12, the processor 10 initializes the program counter to the register used in the non-secure mode in step S8. The processor 10 initializes the program counter by the execution of the secure loader 22.

After finishing the initialization of the program counter, the processor 10 issues the mode transition command. Since the mode transition command is issued, the information processing apparatus switches the security mode from the secure mode to the non-secure mode.

When the security mode is changed to the non-secure mode, the processor 10 starts the execution of the program in step S9. During the execution of the program by the processor 10, the memory controller 11 monitors an access destination by the execution of the program. When the access to the protected data region 32 is not confirmed by monitoring the access destination during the execution of the program (step S10, No), the processor 10 continues the execution of the program in the non-secure mode (step S15). During the continuation of the program execution in the non-secure mode, the memory controller 11 continues to monitor the access destination.

It is supposed that the access to the protected data region 32 is confirmed by monitoring the access destination during the execution of the program (step S10, Yes). In this case, the memory controller 11 denies this access, and transmits the exception signal indicating the occurrence of an exception to the processor 10. When receiving the exception signal, the processor 10 forcibly interrupts the execution of the program by an interruption. When interrupting the execution of the program, the processor 10 issues the mode transition command as the exception process. By the issuance of the mode transition command, the information processing apparatus switches the security mode to the secure mode from the non-secure mode.

When the security mode is changed to the secure mode, the processor 10 reads the secure interpreter 23 from the first memory region 41. Since the security mode is the secure mode, the memory controller 11 permits an access to the first memory region 41 by the processor 10. The processes from step S11 to step S13 described below is carried out by the execution of the secure interpreter 23.

In step S11, the processor 10 determines whether or not the access to the protected data region 32 is caused by the command of the code region 31 placed in the second memory region 42 by the secure loader 22. The processor 10 makes this determination by the execution of the secure interpreter 23.

The processor 10 acquires the program counter generating the exception from the register operating in the non-secure mode. The processor 10 determines whether the acquired program counter indicates the position of the code region 31 placed by the secure loader 22.

When the access to the protected data region 32 is caused by the command of the code region 31 (step S11, Yes), the processor 10 interprets the command of the position indicated by the program counter by the execution of the secure interpreter 23 (step S12). The processor 10 executes either one of a process (1) and a process (2) described below according to the command of the position indicated by the program counter.

(1) Supposing that the command interpreted in step S12 instructs to read data from the main memory 12, and an assembler code is "LDR_r0, [r1]", for example. This command instructs to make an access to the memory address written on a register r1, and write the value written on the position of the memory address to a register r0. The processor 10 acquires the value of the register r1 used in the non-secure mode in step S12 that is the secure mode. The processor 10 reads the value written on the position of the memory address indicated by this value. The processor 10 writes the read value to the register r0 used in the non-secure mode.

(2) Supposing that the command interpreted in step S12 instructs to write data to the main memory 12, and an assembler code is "STR_r0, [r1]", for example. This command instructs to write the value of the register r0 to the memory address written on the register r1. In step S12 that is the secure mode, the processor 10 acquires the value of the registers r0 and r1 used in the non-secure mode. The processor 10 writes the value of the register r0 to the memory address indicated by the value of the register r1.

The processor 10 appropriately sets the program counter to the register used in the non-secure mode. The processor 10 increments the program counter of the register operated in the non-secure mode by the number of the commands executed in step S12. The processor 10 sets the program counter by the execution of the secure interpreter 23 (step S13).

After ending the setting of the program counter, the processor 10 issues the mode transition command. Since the mode transition command is issued, the information processing apparatus switches the security mode from the secure mode to the non-secure mode. When the security mode is changed to the non-secure mode, the processor 10 continues the execution of the program (step S14).

On the other hand, when the access to the protected data region 32 is caused by the command from regions other than the code region 31 in the main memory 12 (step S11, No), the processor 10 determines that the access is abnormal, and executes an error process. The processor 10 executes any one of, for example, processes (3), (4), and (5) described later as the error process.

(3) To forcibly terminate the execution of all processes caused by the program.

(4) To skip the process in step S12, and proceed to the process in step S13.

(5) To execute the process in step S12 after partially changing its content. For example, even when the command interpreted in step S12 is to instruct data reading from the main memory 12, the processor 10 does not read the value written on the position of the memory address. The processor 10 writes a random value to the register r0, for example. On the other hand, when the command interpreted in step S12 is to instruct data writing to the main memory 12, the processor 10 does not write data to the main memory 12.

The processor 10 acquires the value of the program counter generating the exception from the register operating in the non-secure mode. The processor 10 stores the value of the program counter in the main memory 12 or the storage device 14. The main memory 12 may store the value of the program counter in any one of the first memory region 41, the second memory region 42, and the third memory region 43. The storage device 14 may store the value of the program counter in either one of the secure region 18 and the non-secure region 19. The processor 10 stores the value of the program counter in the main memory 12 or the storage device 14, and then, executes any one of the processes (3), (4), and (5).

As described above, the information processing apparatus terminates a series of the process using the secure loader 22 and the secure interpreter 23. While the execution of the program in the non-secure mode is still continued, the memory controller 11 continues to monitor the access destination. The information processing apparatus changes the security mode to the secure mode, and executes the process using the secure interpreter 23, every time an access to the protected data region 32 is made.

According to the embodiment, the information processing apparatus places the code region 31 on the second memory region 42 to which data writing in the non-secure mode is inhibited as the access restriction. The information processing apparatus places the protected data region 32 on the first memory region 41 to which the data writing and data reading in the non-secure mode are inhibited as the access restriction. The information processing apparatus places the code region 31 and the protected data region 32 on the main memory 12 by using the secure loader 22 operated in the secure mode.

The information processing apparatus uses the secure loader 22 in the loading process of the protected program 30. Accordingly, the information processing apparatus can inhibit the execution of a falsified program, even if it uses an OS running in a mode with a low security level.

Since the code region 31 is placed in the second memory region 42, the memory controller 11 blocks a writing access to the code region 31 in the non-secure mode. The information processing apparatus can prevent the command in the code region 31 from being illegally rewritten in a mode with a low security level.

Since the protected data region 32 is placed in the first memory region 41, the memory controller 11 blocks a writing access and a reading access to the protected data region 32 in the non-secure mode. The information processing apparatus can prevent the data in the protected data region 32 from being illegally rewritten and read in a mode with a low security level.

The information processing apparatus always uses the secure interpreter 23 operating in the secure mode for the execution of the protected program 30. The information processing apparatus can inhibit the execution of the protected program 30 in the mode with a low security level. As described above, the information processing apparatus can prevent falsification of a program running on an OS, and can protect data in a specific data region.

The program executed by the information processing apparatus is the same as the program on the universal OS 26, except for a portion involved with an access to the protected data region 32. Accordingly, the program executed in the information processing apparatus can easily be developed by using a library and a system call of the universal OS 26. A large-scale program development of the program to operate on the information processing apparatus is possible by using a development tool for the universal OS 26.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus comprising:
    a processor that operates by switching between two or more security modes, the security modes including a secure mode and a non-secure mode, the non-secure mode having a security level lower than the secure mode;
    a main memory to which the processor accesses, the main memory including a first memory region and a second memory region; and
    a memory controller that controls the main memory, the memory controller inhibiting data writing to the first memory region and the second memory region and data reading from the first memory region in the non-secure mode, and permitting data reading from the second memory region in the non-secure mode, the processor places a first program and a second program in the first memory region, in the secure mode, the processor executes the first program to decode a protected program which was encrypted and to place a code region and a protected data region in the second memory region and the first memory region, respectively,
    the protected program including the code region and the protected data region, in the secure mode, the processor executes the second program to execute the protected program, and
    when the processor executes a program to access the protected data region is in the non-secure mode, the processor executes the second program to confirm an access to the protected data region is caused by a command from the code region placed in the second memory region, and
    wherein the processor executes an error process, when the processor executes a program to access the protected data region in the non-secure mode by a command from a region other than the code region placed in the second memory region.

2. The information processing apparatus according to claim 1, wherein the processor executes a boot program to place the first program and the second program in the first memory region.

3. The information processing apparatus according to claim 1, wherein
    the main memory includes a third memory region, the memory controller permitting data writing to the third memory region and data reading from the third memory region in the non-secure mode, and
    the processor executes the first program to place the protected program having encrypted in the third memory region.

4. The information processing apparatus according to claim 3, wherein
    the processor places memory section information having encrypted in the third memory region, and
    the processor executes the first program to decode the memory section information and to place the code region and the protected data region according to the memory section information having decoded.

5. The information processing apparatus according to claim 1, wherein the processor executes a boot program to place a key in the first memory, the key being used for decoding the protected program.

6. The information processing apparatus according to claim 1, further comprising:
    a storage device to which the processor accesses, the storage device including a secure region, data reading from the secure region being inhibited in the non-secure mode, wherein
    the storage device holds the first program and the second program in the secure region.

7. The information processing apparatus according to claim 1, further comprising:
    a storage device to which the processor accesses, the storage device including a non-secure region, data reading from the non-secure region being permitted in the non-secure mode, wherein
    the storage device holds the protected program having encrypted in the non-secure region.

8. The information processing apparatus according to claim 1, further comprising:
    a storage device to which the processor accesses, the storage device including a non-secure region, data reading from the non-secure region being permitted in the non-secure mode, wherein
    the storage device holds the memory section information having encrypted in the non-secure region, and
    the processor executes the first program to decode the memory section information and to place the code region and the protected data region according to the memory section information having decoded.

9. A program execution method comprising:
    operating by switching between two or more security modes, the security modes including a secure mode and a non-secure mode, the non-secure mode having a security level lower than the secure mode;
    executing a access restriction to a first memory region and a second memory region a main memory to which the processor accesses, the access restriction including inhibiting data writing to the first memory region and the second memory region and data reading from the first memory region in the non-secure mode, and permitting data reading from the second memory region in the non-secure mode,
    placing a first program and a second program in the first memory region, executing the first program in the secure mode to decode a protected program which was encrypted and to place a code region and a protected data region in the second memory region and the first memory region, respectively, the protected program including the code region and the protected data region; and executing the second program in the secure mode, wherein when a is executed in the non-secure mode to access the protected data region is in the non-secure mode, the second program is executed to confirm an access to the protected data region is caused by a command from the code region placed in the second memory region, and wherein an error process is executed, when a program is executed in the non-secure mode to access the protected data region by a command from a region other than the code region placed in the second memory region.

10. The program execution method according to claim 9, further comprising:

executing a boot program to place the first program and the second program in the first memory region.

11. The program execution method according to claim 9, further comprising:

executing the first program to place the protected program having encrypted in a third memory region, data writing to the third memory region and data reading from the third memory region being permitted in the non-secure mode.

12. The program execution method according to claim 11, further comprising:

placing memory section information having encrypted in the third memory region;

executing the first program to decode the memory section information; and placing the code region and the protected data region according to the memory section information having decoded.

13. The program execution method according to claim 9, further comprising:

executing a boot program to place a key in the first memory, the key being used for decoding the protected program.

* * * * *